United States Patent [19]

Ichizuka et al.

[11] Patent Number: 5,476,718
[45] Date of Patent: Dec. 19, 1995

[54] COMPOUND WATER-SEALING SEALANT

[75] Inventors: Isamu Ichizuka; Shuitsu Takahashi; Kouzi Hara; Hiroshi Waki; Shinji Kobe; Tadayuki Sakurada; Yoshitaka Okouchi; Ken Ohkubo; Hiroshi Shimizu, all of Tokyo, Japan

[73] Assignees: Asahi Denka Kogyo Kabushiki Kaisha; Riken Vinyl Industry Co., Ltd., both of Tokyo, Japan

[21] Appl. No.: 386,082

[22] Filed: Feb. 9, 1995

Related U.S. Application Data

[63] Continuation of Ser. No. 120,537, Sep. 14, 1993, abandoned.

[30] Foreign Application Priority Data

Sep. 14, 1992 [JP] Japan ................................ 4-245267

[51] Int. Cl.$^6$ ............................. B32B 27/30; E02B 3/16
[52] U.S. Cl. ...................... 428/424.6; 524/507; 525/129; 405/267; 405/274
[58] Field of Search .................... 525/129; 524/507; 428/424.6

[56] References Cited

U.S. PATENT DOCUMENTS

| | | | |
|---|---|---|---|
| 4,740,404 | 4/1988 | Otsuga | 428/501 |
| 4,756,952 | 7/1988 | Sasayama | 428/212 |
| 5,075,373 | 12/1991 | Takemori | 525/58 |

FOREIGN PATENT DOCUMENTS

| | | |
|---|---|---|
| 0055848 | 7/1982 | European Pat. Off. . |
| 0118998 | 9/1984 | European Pat. Off. . |
| 0160438 | 11/1985 | European Pat. Off. . |
| 0160448 | 11/1985 | European Pat. Off. . |
| 0409586 | 1/1991 | European Pat. Off. . |
| 0410669 | 1/1991 | European Pat. Off. . |
| 147570 | 9/1982 | Japan . |
| 120653 | 7/1984 | Japan . |
| 044575 | 3/1985 | Japan ................................ 525/129 |
| 185532 | 8/1986 | Japan ................................ 525/129 |

OTHER PUBLICATIONS

Patent Abstract of Japan 57–145170.
Patent Abstract of Japan 57–147570.
Patent Abstract of Japan 60–044575.

*Primary Examiner*—David Buttner
*Attorney, Agent, or Firm*—Young & Thompson

[57] ABSTRACT

A compound water-sealing sealant comprising a non-water-swelling thermoplastic resin (A), preferably a vinyl chloride resin, and a water-swelling resin (C) obtained by kneading together 10 to 97% by weight of the non-water-swelling thermoplastic resin (A) and 3 to 90% by weight of a water-swelling material (B). The compound water-sealing sealant is molded by the conjoint extrusion molding of the non-water-swelling thermoplastic resin (A) and the water-swelling resin (C). The water-swelling material (B) is a water-swelling urethane resin which is a prepolymer having isocyanate groups in which the content of terminal NCO groups amounts to 1 to 12%, preferably 2 to 7%, obtained by the reaction of polyisocyanate with at least one polyether polyol of the formula $$R[(OR_1)n\ OH]p$$

wherein R is a polyhydric alcohol residue;

$(OR_1)n$ is a polyoxyalkylene chain comprising oxyalkylene groups each having an oxyethylene group and an alkylene group carrying three or four carbon atoms, and wherein the content of the oxyethylene groups is 20 to 100% of the total molecular weight;

n is a number corresponding to the degree of polymerization of the oxyalkylene groups and giving a hydroxyl group equivalent of 200 to 2500; and p is 2 to 8, preferably 2 to 4.

4 Claims, 1 Drawing Sheet

COMPOUND WATER-SEALING SEALANT

This application is a continuation of application Ser. No. 08/120,537, filed Sep. 14, 1993, now abandoned.

BACKGROUND OF THE INVENTION

1. Field of the Invention

The present invention relates to a compound water-sealing sealant used in the various civil engineering and construction works.

2. Description of the Prior Art

As water-sealing sealants used for watertightness in the various civil engineering and construction works, a complex water-sealing sealant comprising water-swelling part and non-water-swelling part has been used conventionally.

When all of the constituted parts of the compound water-sealing sealant are made of rubbers, it is possible to produce a molding having reliable adhesion by extrusion molding. However, when the constituted parts thereof are made of different kinds, for example, rubbers and thermoplastic resins, extrusion molding cannot be conducted due to the insufficient adhesion. Therefore, it needs the help of an adhesive and the adhesive strength is inferior.

The compound water-sealing sealant comprising water-swelling part and non-water-swelling part, which cannot be produced by extrusion molding as mentioned above, has such troubles that the production thereof is not so easy and the adhesive strength is inferior.

On the other hand, in the case of a sheet pile made of resin, since watertightness is sought either by injecting the water-swelling liquid into the joint portion or inserting the molding of water-swelling sealing sealant thereinto, there is a disadvantage of increasing labor.

SUMMARY OF THE INVENTION

A principal object of the present invention is, therefore, to provide an improved compound water-sealing sealant which solves the above-mentioned problems of the conventional compound water-sealing sealants, that is, a compound water-sealing sealant which can be molded by extrusion molding and which is combined with the high adhesive strength.

The present invention has achieved the above object by providing a compound water-sealing sealant comprising a non-water-swelling thermoplastic resin (A) and a water-swelling resin (C) obtained by kneading said non-water-swelling thermoplastic resin (A) and a water-swelling material (B), said compound water-sealing sealant being molded by the extrusion molding of said non-water swelling thermoplastic resin (A) and said water-swelling resin (C).

The compound water-sealing sealant of the present invention is excellent in exhibiting the reliable watertightness of the water-swelling part, and has many advantages such that the non-water-swelling thermoplastic resin (A) and the water-swelling resin (C) are combined with the high adhesive strength by the extrusion molding and the process for production is easy.

DETAILED DESCRIPTION OF THE INVENTION

Figure 1:
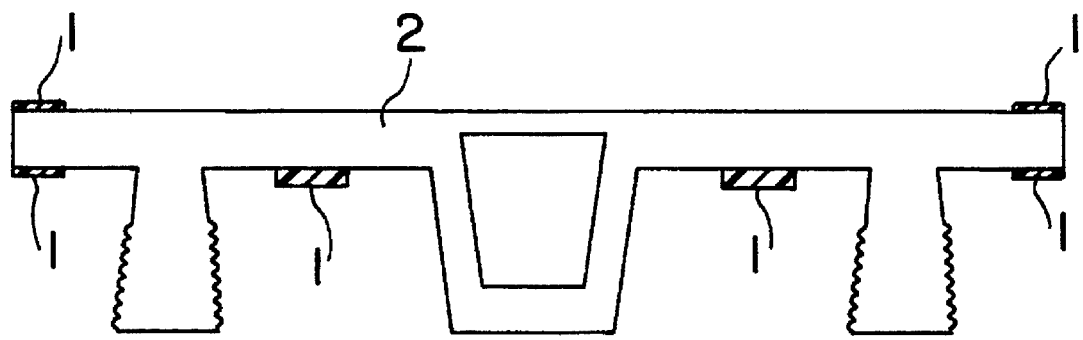
FIG. 1 is a section view illustrating a compound water-sealing board which is one example of the compound water-sealing sealants of the present invention.

The present invention will be described in detail.

Examples of non-water-swelling thermoplastic resin (A) used in the compound water-sealing sealant of the present invention include vinyl chloride resins such as polyvinyl chloride and its copolymers; ethylene-vinyl acetate copolymers, polyethylene, polypropylene and their copolymers; EPDM; and silicone resins. It is preferable to use vinyl chloride resins. When vinyl chloride resins are used, it is preferred to employ plasticizers simultaneously.

Further, examples of water-swelling material (B) used in the complex water-sealing sealant of the present invention include water-swelling urethane resin, carboxymethyl cellulose, polyvinyl alcohol, polyethylene glycol, hydroxyethyl cellulose, methyl cellulose, starch-acrylic acid copolymer, styrene-maleic anhydride copolymer and the salts of these copolymers, sodium polyacrylate, polyvinyl alcohol-maleic anhydride copolymer and their cross linked materials, vinyl ester-ethylene series unsaturated carboxylic acid copolymer and the saponificated materials thereof. It is preferable to use water-swelling urethane resin having high strength and water-swelling properties.

A typical example of the water-swelling urethane resin includes prepolymer(s) having isocyanate groups, in which the content of terminal NCO groups amounts to 1 to 12%, preferably 2 to 7%, obtained by the reaction of one or more polyether polyols represented by the following general formula and polyisocyanate;

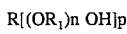

$$R[(OR_1)n\ OH]p$$

wherein R represents a polyhydric alcohol residue;

(OR$_1$)n represents a polyoxyalkylene chain comprising oxyalkylene groups each having an oxyethylene group and an alkylene group carrying three or four carbon atoms, provided that the content of the oxyethylene groups amounts to 20 to 100% of the total molecular weight;

n is a number corresponding to the degree of polymerization of the oxyalkylene groups and giving a hydroxyl group equivalent of 200 to 2500; and p is 2 to 8, preferably 2 to 4.

Examples of the polyhydric alcohol represented as R (polyhydric alcohol residue) in the above-described general formula include aliphatic dihydric alcohols such as ethylene glycol, propylene glycol, 1,4-butylene glycol and neopentyl glycol; trihydric alcohols such as glycerol, trioxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethyl glycerol, pentaglycerol, 1,2,4-butanetriol, 1,2,4-pentanetriol and trimethylolpropane; tetrahydric alcohols such as erythritol, pentaerythritol, 1,2,3,4-pentanetetrol, 2,3,4,5-hexanetetrol, 1,2,3,5-pentanetetrol and 1,3,4,5-hexanetetrol; pentahydric alcohols such as adnite, arabitol and xylitol; and hexahydric alcohols such as sorbitol, mannitol and iditol.

The polyether polyols represented by the above-described general formula may be obtained by adding alkylene oxide having 3 to 4 carbon atoms and ethylene oxide to these polyhydric alcohols in such a conventional manner as to give the desired molecular weight and to give the desired content of the ethylene oxide group. Either random or block addition of the alkylene oxide having 3 to 4 carbon atoms and the ethylene oxide may be employed therefor. The content of the oxyethylene group based on the molecular weight of polyether polyols ranges 20 to 100% by weight. When the content of the oxyethylene group is less than 20%, the swelling ratio of the prepolymer having isocyanate groups obtained by reacting isocyanate becomes small, so that sufficient water-proofness cannot be obtained.

Examples of the polyisocyanate include any polyisocyanates such as 1,4-butane diisocyanate, 1,6-hexane diisocyanate, dicyclohexylmethane diisocyanate, cyclohexane diisocyanate, 1,5-bis-isocyanato-1,3,5-trimethyl-cyclohexane, 1,3-bis-(isocyanatomethyl)-benzene and methylcyclohexane diisocyanate. Fatty acid triisocyanate may be employed together partially. Preferable Examples of aromatic polyisocyanate include any aromatic diisocyanates such as 2,4- or 2,6-tolylene diisocyanate or their isomer mixtures; 4,4'-diphenylmethane diisocyanate, 3,3'-dimethyl-diphenylmethane-4,4'-diisocyanate, m- or p-phenylene diisocyanate, 1,5-naphthylene diisocyanate and their isomers. Further, aromatic polyisocyanate having carbodiimide-, urethodione-, urethane-, urethoimine- or biuret group or isocyanurate rings may be employed alone or together.

The prepolymer having isocyanate groups thus obtained can be used independently or simultaneously with an active hydrogen compound by kneading.

The active hydrogen compound is polyol, polyamine or a mixture thereof each having 2 to 6 of active hydrogen atoms per one molecule and having an average molecular weight per active hydrogen atoms of 30 to 15,000, for example, low-molecular weight diols or triols such as ethylene glycol, 1,4-butanediol, glycerol and trimethylol propane; polyalkylene glycols such as polypropylene glycol, ethylene oxide-propylene oxide copolymers; polymers of alkylene oxide such as ethylene oxide-propylene oxide and low-molecular weight triols such as glycerol, trymethylolpropane, 1,2-6-hexanetriol; low-molecular weight tetraols such as pentaerythritol or low-molecular weight hexaols such as solbitol; or polyamines such as ethylenediamine, 4,4'-methylenebis-1-chloroaniline or polymers of these polyamines and the above-described alkylene oxide.

In the reaction of the prepolymer having isocyanate groups and the active hydrogen compound, any well-known catalyst for promoting the reaction of isocyanate group and an active hydrogen compound can be added. Examples of the catalyst to be added include triethylamine, triehtylenediamine, N-morpholine, stannous octate and dibutyl dilaurate. In connection with the ratio of the polyisocyanate and the active hydrogen compound in the above-described prepolymer having isocyanate groups, [NCO]/[H$^+$] is preferably 0.8 to 2.0, more preferably 1.1 to 1.7.

Further, the above-described water-swelling urethane resin may further contain high molecular materials such as other urethane resins, epoxy resin and acryl resin, optionally, and additives of these resins such as calcium carbonate, clay, aluminium silicate, talc or titanium dioxide. Appropriate amount of color former and antioxidant can be also added thereto.

Regarding the water-swelling resin (C) used in the complex water-sealing sealant of the present invention, it is preferable to blend and knead 10 to 97% by weight of the above-described non-water-swelling thermoplastic resin (A) and 3 to 90% by weight of the above-described water-swelling material (B) [(A)+(B)=100% by weight].

Detailed description regarding the water-swelling resin (C) will be given in the case of using vinyl chloride resin as the non-water-swelling thermoplastic resin (A) and water-swelling urethane resin as the water-swelling material (B).

Examples of the preferable above-mentioned vinyl chloride resin include homopolymer of vinyl chloride, copolymer of vinyl chloride and other monomers and graft polymer of vinyl chloride and other monomers, and chlorinated compounds of the homopolymer, the copolymer or the graft polymer. The vinyl chloride resin preferably has an average polymerization degree of 400 to 4000. An average polymerization degree is preferably 500 to 3000, more preferably 700 to 2000. When the average polymerization degree is less than 400, the strength of the water-swelling resin (C) decreases, and when it is more than 4000, the workability deteriorates.

The vinyl chloride resin may be used in an amount of 10 to 97% by weight based on the mixture of the vinyl chloride resin and the water-swelling urethane resin, and it is preferably from 20 to 95% by weight, still preferably 30 to 90% by weight. When the amount of the vinyl chloride resin is less than 10% by weight, its workability etc. is lost, and the adjustment of hardness according to the plasticizer becomes difficult. Contrarily, when it exceeds 97% by weight, the water swellability deteriorates.

It is preferable to employ a plasticizer when vinyl chloride resin is used as the non-water-swelling thermoplastic resin (A). This plasticizer is not particularly limited. Examples of such a plasticizer are those usually employed when preparing vinyl chloride resin, for example, phthalates such as dioctyl phthalate and ditridecyl phthalate; trimellitates such as trioctyl trimellitate; pyromellitates such as tetra 2-ethylhexyl pyromellitate; and adipate which is a condensate of adipic acid and diol such as 1,2-propylene glycol, triethylene glycol, neopentyl glycol or the like.

The plasticizer may be added in an amount of 0 to 200 parts by weight, preferably 15 to 150 parts by weight, based on 100 parts by weight of the vinyl chloride resin. When it exceeds 200 parts by weight, bleeding occurs and water-tightness decreases.

The above-mentioned water-swelling resin (C) may further contain additives generally added to the vinyl chloride resin. Examples of such additives include an organotin thermostabilizer such as dialkyltin mercaptide, dialkyltin malate and dialkyltin laurate; a metal soap such as calcium stearate, zinc stearate, cadmium stearate, barium stearate and lead stearate; an inorganic stabilizer such as lead tribasic sulfate, lead dibasic stearate, calcium hydroxide and calcium silicate; a chelating agent such as trisnonylphenylphosphite and alkylmonoallylphosphite; waxes such as ester wax and hydrocarbon wax; an epoxide compound such as soybean oil epoxide, linseed oil epoxide and bisphenolepoxide; and a filler such as calcium carbonate, talc, clay and mica. Pigment, antistatic agent, antioxidant, ultraviolet ray absorbing agent and the like may be also contained therein optionally.

The extrusion molding of the present invention will be explained.

In order to mold the compound water-sealing sealant of the present invention by extrusion molding, a co-extruder is used. The co-extruder has two extruders each having the same or different aperture and each being combined with one die thereby extruding and molding the materials at a time.

One example of the co-extruder suitable for molding the compound water-sealing sealant of the present invention by the extrusion molding is like this: a co-extruder having a 90 mm-aperture extruder and a 40 mm-aperture extruder combined in one die, wherein the non-water-swelling thermoplastic resin (A) is extruded by the 90 mm-aperture extruder, and the water-swelling resin (C) is extruded by the 40 mm-aperture extruder. The desired moldings may be obtained in cylinder temperature of 150° to 180° C., die temperature of 170° to 190° C. and extruder output of 100 to 250 kg/hour for the 90 mm-aperture extruder, and cylinder temperature of 160° to 190° C., die temperature of 170° to 190° C. and extruder output of 5 to 50 kg/hour for the 40 mm aperture-extruder, but the molding condition is not limited to the above-mentioned conditions.

Figure 2:
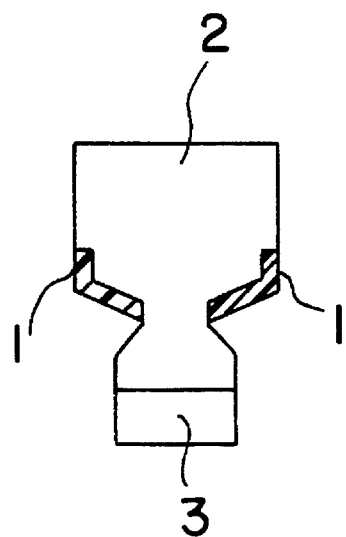
FIG. 2 is a section view illustrating a joint sealant which is one example of the compound water-sealing sealants of the present invention.
Figure 3:
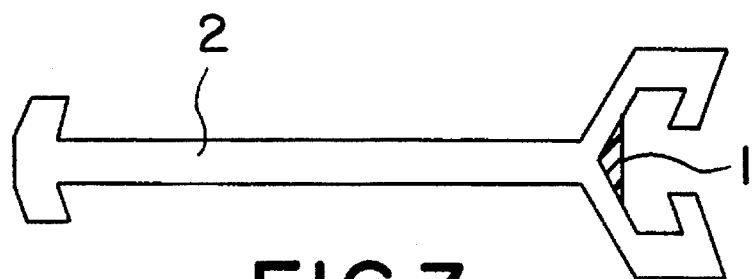
FIG. 3 is a section view illustrating a sheet pile made of resin which is one example of the compound water-sealing sealants of the present invention.

Examples of the compound water-sealing sealant of the present invention include a complex water-sealing board used for the construction joints of concrete as shown in FIG. 1, a joints sealant used for the joint of concrete as shown in FIG. 2 and a sheet pile made of resin as shown in FIG. 3. In FIGS. 1, 2 and 3, 1 shows the water-swelling part molded by the water-swelling resin (C) and 2 shows the non-water-swelling part molded by the non-water-swelling thermoplastic resin (A). 3 in FIG. 2 is the sponge part fixed after the molding in order to improve the watertightness of the joint sealant.

In the compound water-sealing board and the joint sealant, the arrangement of the water-swelling part 1 is not limited to the arrangement shown in FIGS. 1 and 2. The water-swelling part 1 may be freely and pertinently arranged in accordance with the object for using the complex water-swelling board and the joint sealant. In general in the sheet pile made of resin, the water-swelling part 1 is arranged in the cavity (joint part) of the sheet pile as shown in FIG. 3.

The present invention will be described in further detail with reference to Examples of the present invention, Comparative Example and Test Example.

EXAMPLE 1

100 parts by weight of polyvinyl chloride having an average polymerization degree of 1450, 100 parts by weight of plasticizer di-(2-ethylhexyl)phthalate, 2.6 parts by weight of stabilizer for vinyl chloride and 40 parts by weight of water-swelling urethane resin were kneaded to thereby prepare a water-swelling resin (water-swelling polyvinyl chloride resin compound).

Sequentially, the water-swelling polyvinyl chloride resin compound thus obtained and a non-water-swelling resin for the sheet pile part comprising 100 parts by weight of polyvinyl chloride having an average polymerization degree of 1450, 60 parts by weight of plasticizer DOP, 5 parts by weight of stabilizer and 45 parts by weight of filler were extruded and molded by a co-extruder at a time to thereby produce a complex water-sealing board of the present invention (5 mm in thickness, 200 mm in width, 10 m in length) as shown in FIG. 1.

EXAMPLE 2

100 parts by weight of ethylene-vinyl acetate copolymer having ethylene/vinyl acetate=80/20 and an average molecular weight of about 600,000, 2.0 parts by weight of stabilizer for plastic and 40 parts by weight of water-swelling urethane resin were kneaded to thereby prepare a water-swelling resin (water-swelling etylene-vinyl acetate resin compound).

Sequentially, the water-swelling ethylene-vinyl acetate resin compound thus obtained and a non-water-swelling resin for the sheet pile part comprising the above-mentioned ethylene-vinyl acetate copolymer were extruded and molded by a co-extruder in the same manner as described in Example 1 to thereby produce a complex water-sealing board of the present invention shown in FIG. 1 having the same size as the one of Example 1.

COMPARATIVE EXAMPLE 1

The moldings of the non-water-swelling resin for the sheet pile part and the water-swelling polyvinyl chloride resin compound each used in Example 1 are adhered with the use of solvent-type nitrile rubber adhesive BOND G-103 (manufactured by Konishi Co., Ltd.) to thereby produce a complex water-sealing board having the same size as the one of Example 1.

TEST EXAMPLE 1

The adhesive strength each of the compound water-sealing boards produced in Examples 1 and 2 and Comparative Example 1 is measured in accordance with JIS K-6850 (Method for testing the tensile shear adhesive strength of adhesives). The results are as follows.

The compound water-sealing board of Example 1 87 kg f/cm$^2$ or more[*1]

The compound water-sealing board of Example 2 95 kg f/cm$^2$ or more[*1]

The compound water-sealing board of Comparative Example 1 2 kg f/cm$^2$

*1: breakdown of water-swelling resin

What is claimed is:

1. A compound water-sealing sealant molded by the conjoint extrusion molding comprising a first vinyl chloride resin and a water-swelling resin in separate but contiguous layers, said water-swelling resin being obtained by kneading together 10 to 97% by weight of a second vinyl chloride resin and 3 to 90% by weight of a water-swelling urethane resin and containing 100 to 200 parts by weight of a plasticizer based on 100 parts by weight of said second vinyl chloride resin; said water-swelling urethane resin being a prepolymer having isocyanate groups in which the content of terminal NCO groups amounts to 1 to 12%, obtained by the reaction of polyisocyanate with at least one polyether polyol of the formula $$R[(OR_1)n\ OH]p$$

wherein R is a polyhydric alcohol residue;

(OR$_1$)n is a polyoxyalkylene chain comprising oxyalkylene groups each having an oxyethylene group and an alkylene group carrying three or four carbon atoms, and wherein the content of the oxyethylene groups is 20 to 100% of the total molecular weight;

n is a number corresponding to the degree of polymerization of the oxyalkylene groups and giving a hydroxyl group equivalent of 200 to 2500; and p is 2 to 8.

2. The compound water-sealing sealant according to claim 1, wherein said first and second vinyl chloride resins are both polyvinyl chloride.

3. The compound water-sealing sealant according to claim 1, wherein said content of terminal NCO groups is 2 to 7%.

4. The compound water-sealing sealant according to claim 1, wherein p is 2 to 4.

* * * * *